Figure 1:
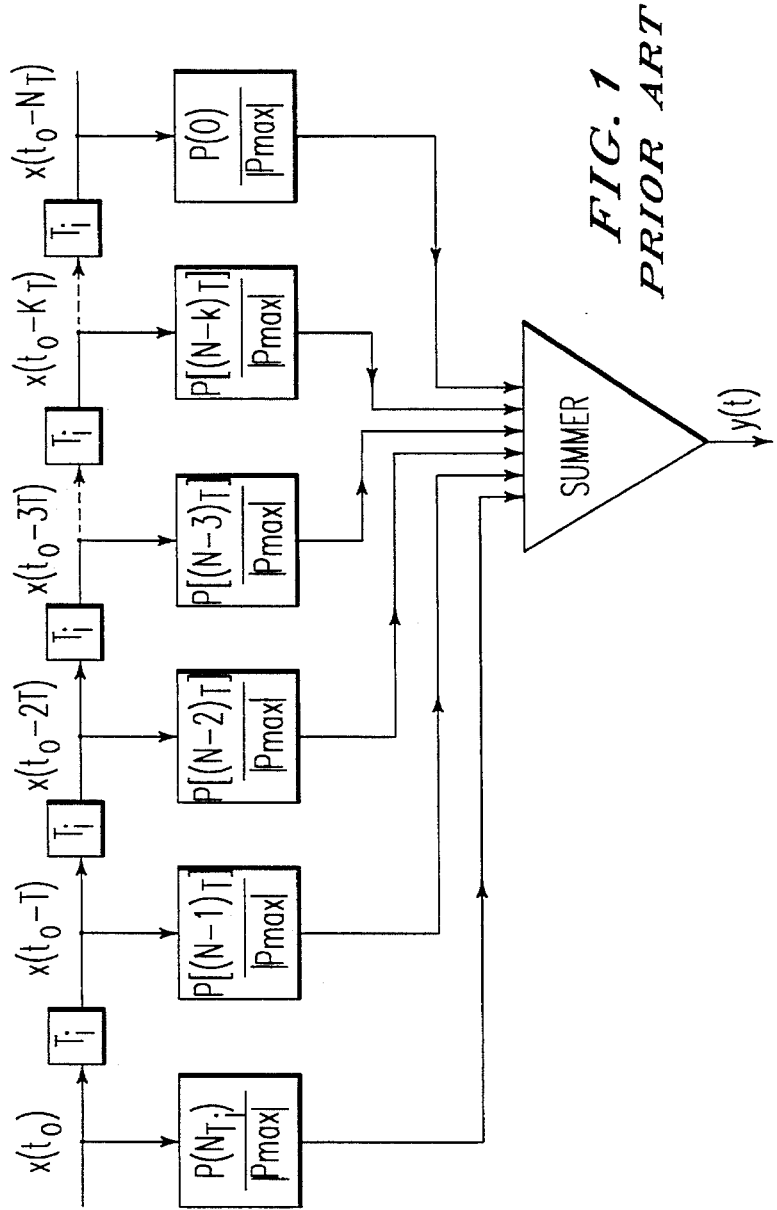

United States Patent
Tournois et al.

[11] Patent Number: 5,475,525
[45] Date of Patent: Dec. 12, 1995

[54] TRANSVERSE ELECTRICAL FILTER OPERATING OPTICALLY

[75] Inventors: Pierre Tournois, Le Rouret; Daniel Dolfi, Orsay; Jean-Pierre Huignard, Paris, all of France

[73] Assignee: Thomson-CSF, Puteaux, France

[21] Appl. No.: 946,358

[22] PCT Filed: Mar. 27, 1992

[86] PCT No.: PCT/FR92/00277

§ 371 Date: Nov. 17, 1992

§ 102(e) Date: Nov. 17, 1992

[87] PCT Pub. No.: WO92/17803

PCT Pub. Date: Oct. 15, 1992

[30] Foreign Application Priority Data

Mar. 29, 1991 [FR] France ................. 91 03854

[51] Int. Cl.⁶ ................. G02F 1/03; G02B 26/08
[52] U.S. Cl. ................. 359/245; 359/259; 359/301; 372/700; 250/227.12
[58] Field of Search ................. 359/245, 246, 359/247, 250, 259, 261, 301, 302, 303, 331, 495; 372/700; 250/227.12

[56] References Cited

U.S. PATENT DOCUMENTS

| | | | |
|---|---|---|---|
| 3,272,988 | 9/1966 | Bloom et al. | 359/122 |
| 4,882,235 | 3/1988 | Resler | 428/642 |
| 5,117,237 | 5/1992 | Riza | 342/375 |
| 5,329,118 | 7/1994 | Riza | 250/227.12 |

FOREIGN PATENT DOCUMENTS 0331462  9/1989  European Pat. Off. .

OTHER PUBLICATIONS

Proceedings of the Society of Photo-Optical Instrumentation Engineers, vol. 176, 1979, pp. 17–27, Taylor, "Fiber and Integrated Optical Devices for Signal Processing".

Primary Examiner—Paul M. Dzierzynski
Assistant Examiner—Darryl S. Collins
Attorney, Agent, or Firm—Oblon, Spivak, McClelland, Maier & Neustadt

[57] ABSTRACT

The invention relates to a programmable transverse filter required for the matched filtering of signals with very wide passband. The signals to be filtered modulate one or more optical carriers (F1) in a modulator (MOD). Each carrier is distributed over several channels by a distributor (DIV). A delay creation circuit (CR1 to CRn) is provided in each channel. These channels are next summed after having been correctly delayed and assigned a coefficient characteristic of the signal to be detected.

24 Claims, 3 Drawing Sheets

TRANSVERSE ELECTRICAL FILTER OPERATING OPTICALLY

The invention relates to a transverse electrical filter operating optically and more particularly to a programmable transverse filter using optical architecture.

This programmable transverse filter is more particularly applicable to the matched filtering of wideband signals.

The principle of the transverse filter is the summation of signals extracted with various delays and various weights, along a transmission line that is excited by the signal to be filtered. It is sought to determine, with the aid of such a linear filter, the time of appearance of a signal p(t) known a priori. This transient signal p(t) of finite duration T is in reality mixed with noise b(t) which is assumed to be independent of p(t). Thus, it is the signal x(t)=p(t)+b(t) which it is necessary to filter. When such a filter is produced and maximizes the signal-to-noise ratio at the instant T, it is said to be matched. In the case of ideal white noise, the impulse response h(t) of the matched filter is h(t)=p(-t). When the noise is not white, this filter is no longer optimal, however it nevertheless still enables the time of arrival of p(t) to be determined in most cases.

Matched filters are produced in the majority of cases by the weighting method such as described in the document: "J. Max—"Signal processing methods and techniques and applications to physical measurements" published by Masson, 1987. The signal x(t) is permanently injected into the input of a delay line consisting of N elements each giving a delay τ as shown in FIG. 1. It is furthermore assumed that there is sampling on N+1 points of the signal p(t):p(o), p(τ), p(Nτ). The output from each element constituting the delay line is weighted by a coefficient $\lambda_k$ such that:

$$\lambda_k = p[(N-k)\tau]/|P_{max}|$$

where $|P_{max}|$ is the maximum value of the modulus of p(t). We thus have $-1 < \lambda_k < 1$. When at a given instant $t_o$ we form the sum of the N+1 weighted outputs, we obtain a signal $Y(t_o)$ such that:

$$y(t_o) = \sum_{k=0}^{N} \times (t_o - k\tau)p[(N-k)\tau] \quad \text{with } N\tau = T$$

$$= \sum_{k=0}^{N} \times (t_k)p[t_k - (t_o - T)] \quad \text{with } (t_k = t_o - k\tau)$$

This is in fact the output of the matched filter at the instant $t_o - T$.

The present technique makes it possible to produce such a device by numerical means but it is then limited to low and middle frequencies. Other solutions, based on optical fibers, have been proposed such as that described in the document K. P. Jackson—H. J. Shaw —"Fiber-optic delay-line signal processors" in Optical Signal Processing, edited by J. L. Horner, Academic Press, but they run up against the difficulty of producing a large number of coupling points.

The device according to the invention makes it possible to resolve these two problems, namely, it allows operation at high frequencies with a large number of coupling points and it therefore permits a large number of samples on signals at very high frequencies, typically N=1024 from 0 to 20 GHz.

The invention therefore relates to a transverse filter characterised in that it includes:

an electrooptical modulator receiving an optical wave and an electrical signal to be filtered and retransmitting the optical wave modulated by the electrical signal, this retransmitted optical wave being linearly polarized;

a beam splitter splitting the modulated optical wave into several elementary channels;

at least one unit for creating delays in series following the direction of the elementary channels, each unit including as many delay creation circuits as there are elementary channels and each placed on an elementary channel;

a beam concentrator grouping the various channels together and focusing them onto a light intensity detector.

Figure 2:
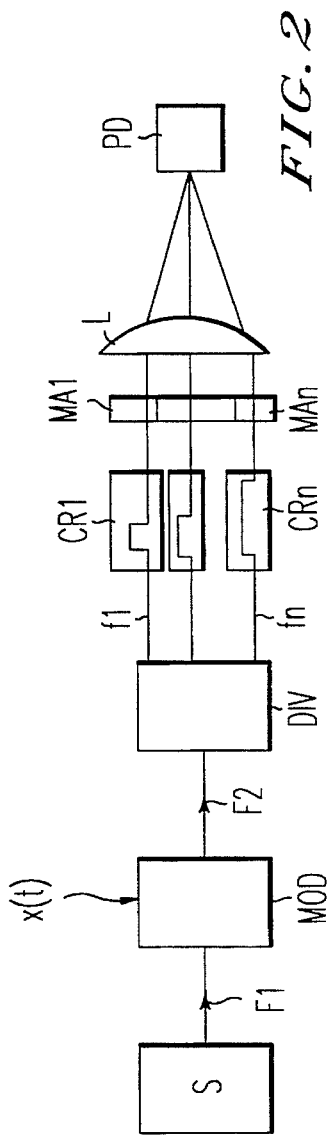
Figure 3:
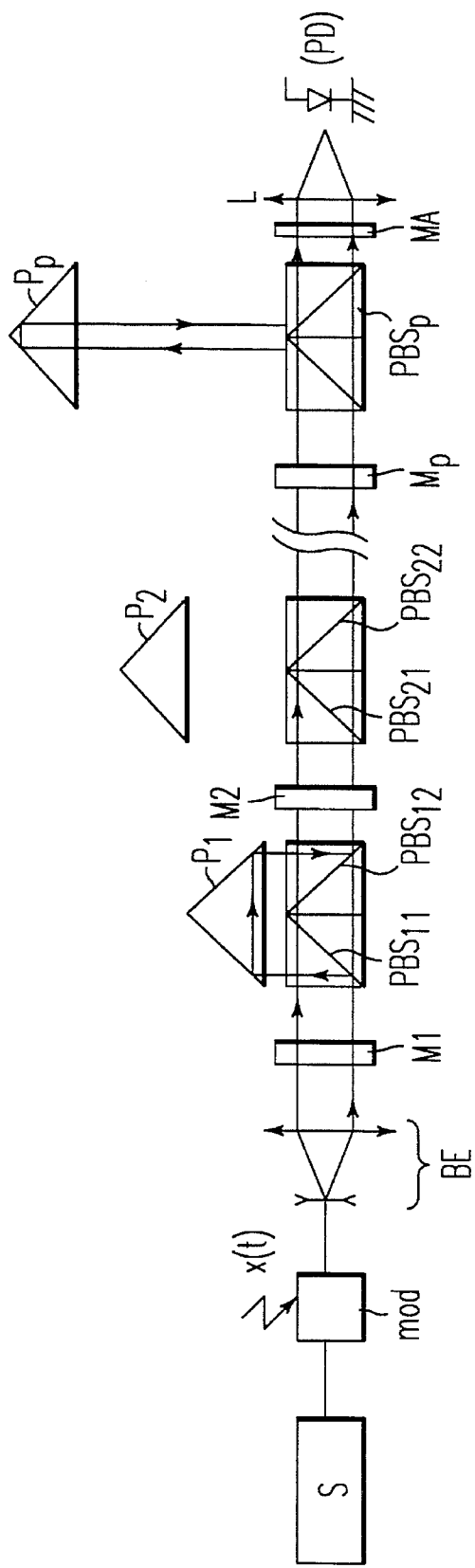
Figure 4:
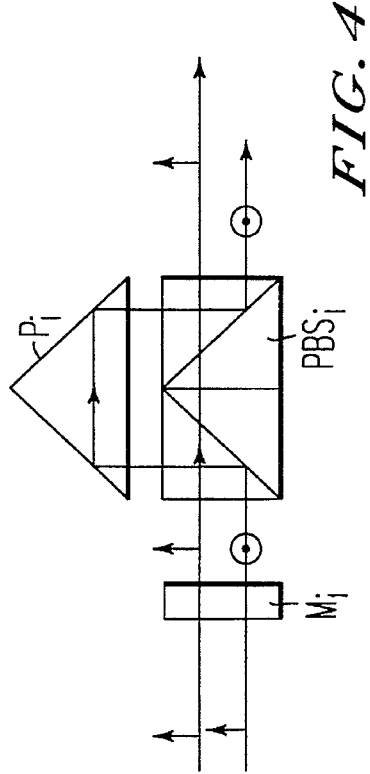
Figure 5:
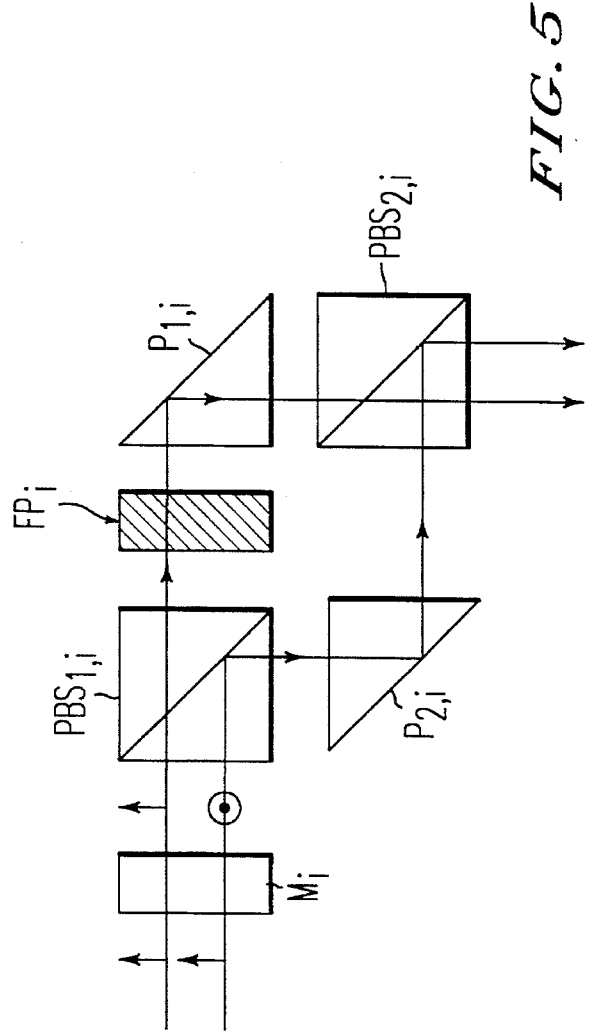
Figure 6:
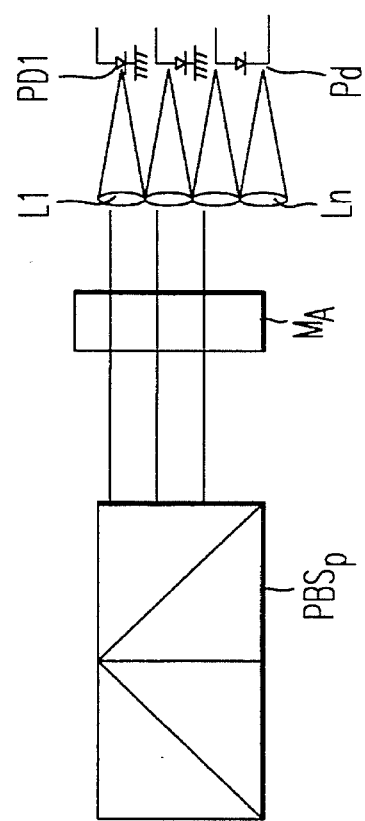

The various subjects and characteristics of the invention will emerge more clearly in the description which follows and in the attached figures which show:

FIG. 1, a system according to the known art already described;

FIG. 2, a general illustrative embodiment of a transverse filter according to the invention;

FIG. 3, a detailed illustrative embodiment of a transverse filter according to the invention;

FIG. 4, an illustrative embodiment of a unit for creating delays;

FIG. 5, a variant embodiment of a unit for creating delays;

FIG. 6, a variant embodiment of the means of detecting light intensity.

A general illustrative embodiment of a transverse filter according to the invention will therefore now be described with reference to FIG. 2.

This filter includes:

a source S emitting a light beam F1;

an electrooptical modulator MOD receiving the beam F1 as well as an electrical control signal x(t) which enables the beam to be modulated so as to provide a beam F2 modulated by the electrical signal x(t) to which it is desired to apply a transverse filtering, that is to say to detect an item of information relating to frequencies distributed over a time T;

a beam splitter DIV receiving the beam F2 and distributing it over n elementary channels f1 to fn;

circuits for creating optical delays CR1 to CRn, each located in series on an elementary channel f1 to fn;

amplitude modulators MA1 to MAn modulating the intensity of the light of each elementary channel;

a focusing device L for focusing the various channels;

a light intensity detector device PD (photodetector) receiving the focused beam.

Thus, by assigning suitable delays to each delay circuit CR1 to CRn, a specified item of information contained in the signal x(t) will be found by detecting a light intensity peak.

A detailed illustrative embodiment of the device of the invention will now be described with reference to FIG. 3.

The linearly polarized beam F1 emanating from a laser source S is coupled into a modulator MOD. The latter is, for example, a modulator integrated on $LiNbO_3$ and possesses a passband stretching from 0 to 20 GHz. It is excited by the signal to be filtered x(t). The linearly polarised beam F2 emanating from the modulator MOD is next expanded by means of an afocal system BE so as to cover the surface of a spatial light modulator $M_1$. This modulator is for example a liquid crystal cell containing n×n picture elements. In each picture element, the polarization of the incident light can be rotated by 0° to 90°, depending on the voltage applied It may be noted that just two states (0° and 90°) are necessary and hence ferroelectric liquid crystal cells are very suitable. The spatial modulator $M_1$ is arranged so that it apportions n×n parallel pathways in the stretched laser beam. An assembly of polarization splitting cubes $PBS_{11}$ and $PBS_{12}$ and of a completely reflecting prism P1 is placed in series with the modulator $M_1$. As can be seen in FIG. 4, choosing the state of polarization on each picture element of the modulator $M_1$ makes it possible to choose the route followed by each of the n×n channels comprising the optical carrier of the signal x(t). The spatial modulator $M_1$—splitting cubes $PBS_{11}$/$PBS_{12}$—reflection device P1 assembly constitutes a first delay creation circuit.

This first delay creation circuit is followed by a second delay creation circuit placed in series (spatial modulator $M_2$—splitting cubes $PBS_{21}$/$PBS_{22}$—reflection device P2) and so on up to a $p^{th}$ delay creation circuit (spatial modulator Mp—splitting cubes $PBS_{p1}$/$PBS_{p2}$—reflection device Pp). These various circuits are such that each picture element of each spatial modulator $M_2$ to $M_p$ is aligned with an elementary channel created by the spatial modulator $M_1$. When the expanded beam has passed through all the splitting cubes ($PBS_i$), it enters a spatial amplitude modulator MA. This is for example a liquid crystal cell identical to the spatial modulators Mi but arranged between crossed polarizers in order to modulate the intensity of the beam crossing it. The modulator MA makes it possible, in each channel, to assign a previously defined coefficient $\lambda k$ to the amplitude of the optical carrier. A lens L is employed next providing for the summation of all these parallel channels on a fast photodiode PD. This summation must be incoherent so as not to be disturbed by optical phase shift terms. It is therefore necessary for the coherence length of the laser to be less than the smallest optical path difference permitted by the system, that is to say by the difference imposed by the smallest delay increment. At the instant $t_o$, the optical carrier, in each channel, before crossing MA is of the form:

$$S_k(t_o) = S_o x(t_o - k\tau) |\exp j\omega(t_o - k\tau)|^2$$

where:

$\omega$ is the angular frequency of the laser, $\tau$ is the delay increment of the device.

In actual fact the reflection devices (prisms Pi) are arranged so as to define delays in geometric progression: $\tau$, $2\tau$, $4\tau$, ... $2^{(p-1)}\tau$ with moreover $2^p\tau = N\tau$. On crossing MA, each channel is assigned a coefficient $\lambda_k$ characteristic of the signal to be detected in x(t) and thus becomes:

$$S_k(t_o) = S_o \lambda_k \times (t_o - k\tau)$$
$$= [p((N-k)\tau) \times (t_o - k\tau)/|P_{max}|]$$

Since the summation is incoherent, the photodiode PD delivers a photocurrent proportional to the sum:

$$T(t_o) = \frac{1}{|P_{max}|} \sum_{k=o}^{N} p[(N-k)\tau] \times (t_o - k\tau)$$

which is the output of the matched filter at the instant $t_o$–T.

It may be remarked that the reconfigurability of the spatial modulators Mi is not indispensable here. Indeed, the paths can be fixed once and for all and the value of the $\lambda_k$ alone may be modified. The spatial modulators Mi may therefore be replaced by fixed arrays of $\lambda/2$ plates ($\lambda$ wavelength of the laser).

A degree of reconfigurability of the system may however be useful when $2^p > N$. Indeed, it is then possible to choose the desired delay sequence:

$$\tau, 2\tau, 4\tau, \ldots 2^{(n-1)}\tau = N\tau$$

or $$\tau' = 2\tau, 2\tau', 4\tau', \ldots 2^{(n-2)}\tau' = N\tau \text{ etc} \ldots$$

and thus to match the passband of the filter to that of the signal p(t) to be detected.

FIG. 5 shows a variant embodiment of a delay circuit.

It includes an entrance polarization-splitting device (cube) $PBS_{1,i}$, two reflection devices (prism) $P_{1,i}$ and $P_{2,i}$ and an exit splitter device (cube) or polarization recombiner $PBS_{2,i}$. These four devices determine, for the two polarization, two optical paths of equal geometric length. However, one of the paths includes a parallel sided plate FPi which incorporates an optical delay into the optical path. The two optical paths are therefore not of equal optical length. Such a variant thus makes it possible to produce very small delays.

FIG. 6 shows a variant embodiment of the device of the invention.

In this variant, the lens L is replaced by an array of lenses L1, ... Ln. A fast photodiode PD1, PD (1<n<j) is placed at the focus of each lens. Each lens makes it possible to sum N parallel channels. Thus the modulator MA is divided into n regions each of N pixels. With each region is associated a series of coefficients $\lambda_{k,j}$ enabling a signal pj(t), present in x(t), to be recognized. This is equivalent to arranging J matched filters in parallel, the photocurrent provided by each photodiode being the result of filtering x(t) with the filter corresponding to pj(t).

According to another variant embodiment, the number of samples desired is typically N=1024. In this variant, the number of elements of the spatial modulators Mi is n×n= N×n'. Within a given group of n' picture elements, the latter are in the same state of excitation. The architecture proposed thus provides N beams of n' parallel pathways. Each beam therefore plays the role previously described of a picture element. Similarly MA contains n×n pixels. The picture elements of this spatial modulator MA have no more than two possible transmission states 0 and 1. Thus, by choosing the number of picture elements of the modulator MA in the passing state in a beam of n' pathways, the desired weight is assigned to the delay value provided by this beam. Control of the weights is then no longer analog but becomes digital. The number n' therefore quantifies the dynamic range of the weights.

By way of illustrative embodiment, the transverse filter according to the invention can be produced as follows:

S: largely multimode, diode-pumped, solid-state laser, a few 100 mW, $\lambda$=1.3 µm–1.5 µm MOD: optical modulator integrated on $LiNbO_3$ wide band 0→20 GHz depth of modulator 80 to 100% insertion loss 6 dB Mi: 40×40 mm² ferroelectric or twisted nematic liquid crystal cells 32×32 individually controlled pixels extinction ratio between crossed polarizers: 1:1000

MA: identical to the Mi but placed between crossed polarizers

PD: fast photodiode

Value of the delays: for 20 GHz of passband, the increment $\tau$=25 ps 1024 increments are produced in 1024 pathways by means of 10 modulators Mi The device according to the invention offers the following advantages:

It makes it possible to filter signals of very high frequency and with wide passband since the value of the delay increment can be as small as desired (see FIG. 5: the delay results from interposing a parallel sided plate in the path of one of the polarization).

Control of the weights $\lambda_k$ is effected in parallel with a single device Mi. Moreover, this control, which is independent in each pathway, makes it possible to compensate the dispersion in levels resulting from the various routes followed.

The architecture proposed is fully reconfigurable at each instant. The value of the delay increment can thus be continuously matched to the passband of the signal to be filtered.

A larger number of pathways than delays allows for the defectiveness of some picture elements without affecting the performance of the system.

Clearly, the preceding description has been given merely by way of example and other variants may be envisaged without departing from the scope of the invention. In particular, the delay creation devices (liquid crystal cells, polarization splitters, etc.) as well as the amplitude modulator may be produced differently from what has been described.

We claim:

1. Device for processing a signal comprising:

an electro-optical modulator for receiving an optical wave and an electrical signal and retransmitting the optical wave modulated by the electrical signal, this retransmitted optical wave being linearly polarized;

a beam splitter aligned along a path of the retransmitted optical wave for splitting the modulated optical wave into several elementary channels so that the modulated optical wave is travelling simultaneously along more than one of the several elementary channels relative to another one of the channels;

a unit for creating time delays for a portion of the modulated optical wave along at least one of the channels relative to another one of the channels, said unit including means for creating said time delays for each of the elementary channels;

a spatial light modulating means for modulating an amplitude of at least one of the elementary channels relative to an amplitude of another one of the elementary channels;

a light intensity detector; and a beam concentrator for concentrating the portions of the modulated optical signals from the various channels and for focusing the optical signals from the various channels onto said light intensity detector.

2. A device according to claim 1, wherein time delays provided to each elementary channel are independently controlled by said unit for creating time delays.

3. A device according to claim 1, further comprising:

a polarizer arranged ahead of the beam splitter in such a way that the modulated optical wave is linearly polarized at the beam splitter.

4. A device according to claim 3, further comprising:

a liquid crystal cell containing at least as many picture elements as there are elementary channels, each picture element including control means enabling control of the direction of polarization of the light to be rotated by 90°; and a first polarization splitter for transmitting the light of a first polarization through a first circuit along a specified exit direction and the light of a second polarization through a second circuit along the same specified exit direction.

5. A device according to claim 4, wherein the beam splitter transmits the light of the first polarization along the exit direction and said exit direction is substantially collinear with the direction of the incident light, towards a unit for creating successive time delays or towards the beam concentrator, and the beam splitter also reflects the light of the second polarization towards a delay circuit, which delay circuit then retransmits the light along a direction that is collinear with the exit direction.

6. A device according to claim 5, further comprising:

a second polarization splitter that is in series with the first beam splitter, said second polarization splitter for transmitting the first polarization, said unit for creating delays being coupled to this second polarization splitter in 7. A device according to claim 4, further comprising:

a parallel sided plate; and wherein the first circuit and the second circuit are of equal geometrical length, one of the first and second circuits being partially defined by said parallel sided plate.

8. A device according to claim 7, further comprising:

a first reflection device;

a second reflection device;

wherein the light of the first polarization transmitted by the first polarization splitter is reflected by said first reflection device towards a second polarization splitter; and wherein the light of the second polarization reflected by the first polarization splitter is reflected by said second reflection device towards the second polarization splitter in such a way that the latter renders the light of the two polarizations collinear.

9. A device according to claim 8, further comprising:

a plurality of delay creation units for creating time delays in one of the several elementary channels relative to another one of the several elementary channels; and such a way that the light originating from said unit for creating delays is reflected along the exit direction.

10. A device according to claim 4, wherein each liquid crystal cell includes several groups of picture elements, each of the groups of picture elements corresponding to a delay creation channel.

11. A device according to claim 1, wherein said spatial light modulating means comprises amplitude modulators, each one of which is located in series with one of the several elementary channel, thereby providing the ability to selectively filter each one of the several elementary channels.

12. A device according to claim 11, wherein said amplitude modulators each include a crystal cell containing as many picture elements as there are elementary channels, each picture element being in a path of one of said several elementary channels.

13. A device according to claim 1, wherein the beam concentrator includes a lens.

14. A device according to claim 1, wherein said light intensity detector includes a photodetector.

15. A device according to claim 1, wherein said beam concentrator includes several lenses and several light intensity detectors, each of said several lens focusing the light of a specified number of the several elementary channels onto a specified one of said several light intensity detectors.

wherein each delay creation unit includes parallel sided plate and wherein one of the parallel sided plates included in one of the several elementary units has a thickness which is different from one of the parallel sided plates included in another one of the several elementary units.

16. A device according to claim 1, wherein said spatial light modulator is in series with each one of the several elementary channels and comprises several picture elements per channel, each picture element having two possible optical states (blocking or passing states), whereby the number of elements in the passing state enables a weight to be assigned to the value of the time delay of that channel.

17. A device according to claim 16, further comprising:
   a liquid crystal cell containing at least as many picture elements as there are elementary channels, each picture element including means for controlling the direction of polarization; and
   wherein each liquid crystal cell includes several groups of picture elements, each one of the several groups of picture elements corresponding to a delay creation channel.

18. A filter for filtering a time dependent signal, comprising:
   an electro-optic modulator for modulating a property of an optical beam with said time dependent signal when said time dependent signal is applied to said electro-optic modulator, said optical beam having a direction of propagation, a spatial extent in a transverse direction that is transverse to said direction of propagation, and being modulated along said direction of propagation by application of said time dependent signal to said electro-optic modulator;
   means for selectively delaying a first portion of said optical beam that is located in a different position along the transverse direction of said optical beam than a second portion of said optical beam, relative to the second portion of said optical beam;
   a spatial light intensity modulator, situated along the path of said optical beam, for independently modulating intensity of the first portion and the second portion; and
   means for detecting the combined intensity of both the delayed portion and the non-delayed portion of said optical beam.

19. A filter according to claim 18, wherein said property is electric polarization direction of said optical beam.

20. A filter according to claim 18, wherein said spatial light intensity modulator is disposed along the path of said optical beam and downstream, relative to said direction of propagation of said optical beam, of said means for selectively delaying.

21. A filter according to claim 20, wherein said means for selectively delaying further comprises a polarizing beam splitter aligned along the path of said optical beam and downstream, relative to said direction of propagation, of said electro-optic modulator.

22. A filter according to claim 20, further comprising a plurality of sets of spatial light intensity modulators and polarization beam splitters, each set being arranged along the path of the optical beam.

23. A filter according to claim 18, further comprising a beam expander for expanding the spatial extent of the beam in the transverse direction, said beam expander being disposed along the path of the optical beam upstream of the means for selectively delaying; and
   a beam focuser that is disposed along the optical path of the beam and downstream of the spatial light intensity modulator, said focuser for focusing the beam size down to a reduced size for detection by said means for detecting.

24. A filter according to claim 18, further comprising a laser for generating the optical beam and arranged to transmit the optical beam through the electro-optic modulator.

* * * * *